(12) United States Patent
Zhu et al.

(10) Patent No.: US 8,280,381 B2
(45) Date of Patent: Oct. 2, 2012

(54) INTRA-SYSTEM HANDOFF METHOD

(75) Inventors: Jinguo Zhu, Shenzhen (CN); Zaifeng Zong, Shenzhen (CN); Xiliang Liu, Shenzhen (CN); Minya Ye, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 529 days.

(21) Appl. No.: 12/476,591

(22) Filed: Jun. 2, 2009

(65) Prior Publication Data
US 2009/0257402 A1 Oct. 15, 2009

Related U.S. Application Data

(63) Continuation of application No. PCT/CN2007/003976, filed on Dec. 29, 2007.

(30) Foreign Application Priority Data

Jul. 6, 2007 (CN) .......................... 2007 1 0126070

(51) Int. Cl.
*H04W 36/00* (2009.01)
*H04W 4/00* (2009.01)
*H04L 12/66* (2006.01)

(52) U.S. Cl. ......... 455/439; 455/436; 370/331; 370/356

(58) Field of Classification Search .................. 455/436, 455/435.1; 370/330, 356
See application file for complete search history.

(56) References Cited

U.S. PATENT DOCUMENTS

2008/0214190 A1* 9/2008 Aalto ......................... 455/435.1
2009/0023448 A1* 1/2009 Attar et al. .................... 455/436

* cited by examiner

*Primary Examiner* — Kent Chang
*Assistant Examiner* — Kuo Woo
(74) *Attorney, Agent, or Firm* — Christopher P. Maiorana, PC (57) ABSTRACT

The present invention provides an intra-system handoff method, comprising the following steps: S302, when deciding a handoff of UE to a target base station, a source base station issues a handoff request to the target base station; S304, in response to the handoff request from the source base station, the target base station informs the source base station to conduct handoff for the UE; S306, after the completion of the handoff, the target base station issues an update request to an MME; and S308, in response to the update request from the target base station, the MME conducts Serving GW selection, and further fulfils the intra-system handoff. By the present invention, the target eNodeB need not determine whether access to the Serving GW is available, and accordingly the target eNodeB can avoid from configuring Serving GW.

20 Claims, 8 Drawing Sheets

INTRA-SYSTEM HANDOFF METHOD

This is a continuation of International Application PCT/CN2007/003976, with an international filing date of Dec. 29, 2007, currently pending, which is herby incorporated by reference.

TECHNICAL FIELD

The present invention relates to the communication field, specifically, relates to an intra-system handoff method.

BACKGROUND OF THE INVENTION

With a sudden rise of World Interoperability for Microwave Access (WiMAX), the 3rd Generation Mobile Communication System has to improve its network performance and reduce the costs of network construction and operation, to keep competitive in the field of mobile communication. Therefore, the standardization working group of 3rd Generation Partnership Project (3GPP) is now devoting to researching the evolution of Packet Switch Core (PS Core) and Universal Mobile Telecommunication System Radio Access Network (UTRAN). The subject of this research is called System Architecture Evolution (SAE).

The research aims to get the Evolved PS Core (E-PS Core) to provide higher transmission rate, shorter transmission delay, grouping optimization and to support mobility management of Evolved UTRAN E-UTRAN, UTRAN, Wireless Local Area Network (WLAN) and other Non-3GPP access network.

Figure 1:
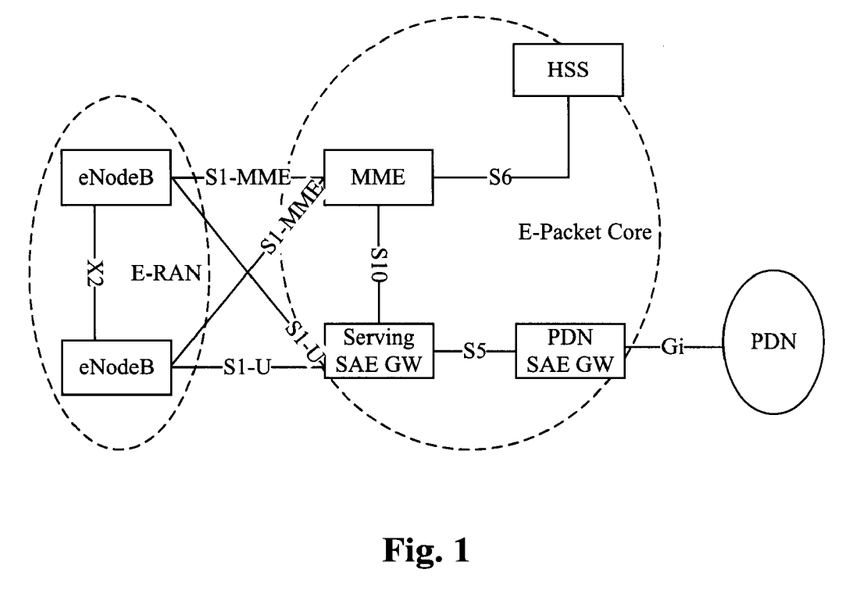
FIG. 1 is the schematic view of the SAE frame of the relevant techniques.

As shown in FIG. 1, presently, the architecture of SAE comprises the following network elements:

Evolved Radio Access Network (E-RAN), used to provide higher uplink /downlink rate, shorter transmission delay and more reliable wireless transmission. The network element contained in E-RAN is Evolved NodeB (eNodeB), which can provide wireless resource for user's access. The eNodeBs are interconnected with each other through the X2 interface.

Home Subscriber Server (HSS, used to store subscriber data permanently.

Packet Data Network (PDN is a network used to provide service for users.

E-Packet Core is used to provide shorter delay and more wireless access system access. E-Packet Core comprises the following network elements:

Mobility Management Entity MME is a control panel function entity used to store user data temporarily, responsible for managing and storing User Equipment (UE) context (e.g. UE/user identifier, mobility management state, user safety parameter), and distribute temporary identifier for users. When UE is located in a tracking area or a network, MME is responsible for user authentication, processing all the non-access layer message between MME and UE, and triggering paging in SAE. ENodeB and MME are connected through the S1-MME interface.

Serving Gateway (Serving GW) is a user plan entity, it is responsible for data routing process of the user plane, terminating downlink data of UE in idle mode, managing and storing SAE bearer context of UE (e.g. IP bearer service parameters and interior routing information of network). Serving GW is a user plane anchor in 3GPP system, and a user can be served by only one Serving GW at a time; eNodeB and Serving GW are connected through the S1-U interface. MME controls Serving GW through the S10 interface.

Packet Data Network Gateway (PDN GW) functions as gateway of UE access to PDN. PDN GW is a mobile anchor in 3GPP and non-3GPP access system. A user can access more than one PDN GW at a time.

Figure 2:
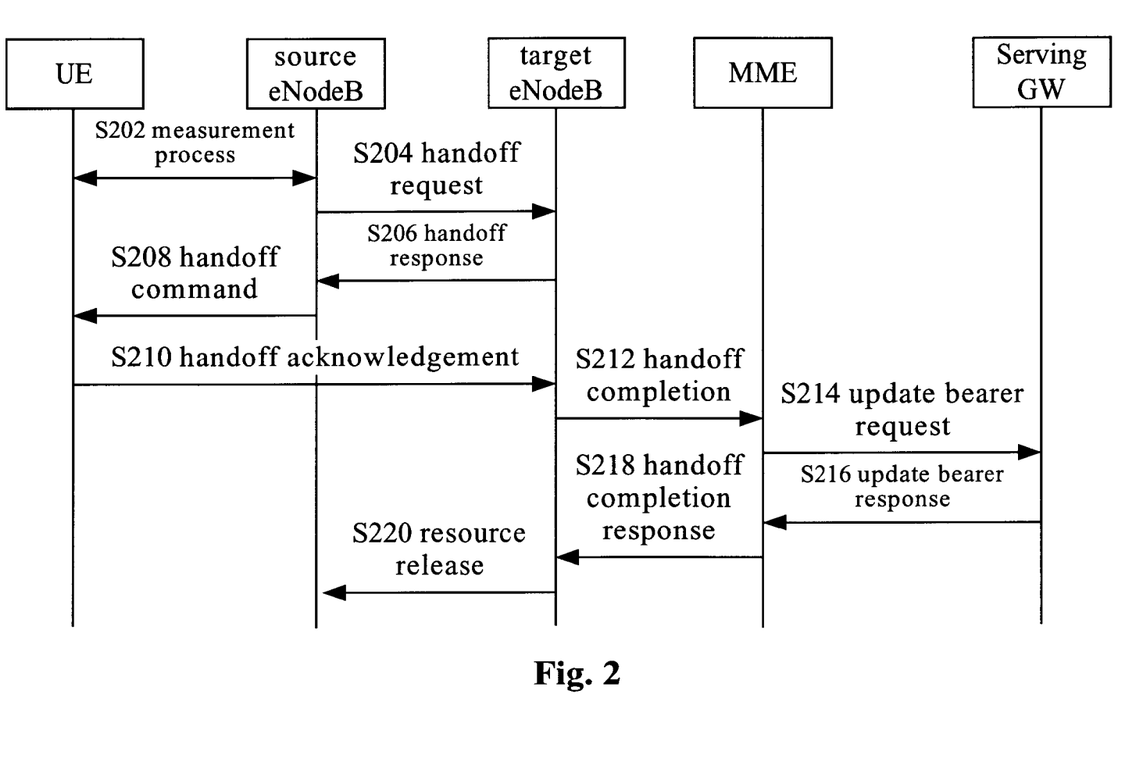
FIG. 2 is the flow chart of handoff through the X2 interface of the relevant techniques.

Another notable feature of wireless mobile communication system is supporting mobility. In active state, the movement from one eNodeB to another without interrupting service is called a handoff process. In 3GPP, there are two kinds of handoff process between eNodes (1) handoff through the X2 interface, and (2) handoff through the S1 interface. The handoff through the X2 interface is illustrated as shown in FIG. 2, comprising the following steps:

S202, source eNodeB orders a UE to conduct a measurement, and after the measurement report is returned by the UE, the source eNodeB decides to switch to a target cell.

S204, the source eNodeB searches for a corresponding target eNodeB according to the target cell. If the target eNodeB can be found while connected with the source eNodeB via the X2 interface, the source eNodeB will issue a handoff request to the target eNodeB. The handoff request carries address information of the current MME and Serving GW and the user plane tunnel information of Serving GW.

S206, the target eNode determines whether there is a connection (or access) between the current MME and Serving GW. If there is a connection, the target eNode will conduct relevant resource reservation and then return a handoff response to the source eNodeB. Wherein, the handoff request carries relevant resource information.

S208, after receiving the handoff response, the source eNodeB will order UE to begin the handoff process, with resource information of the target eNodeB.

S210, after switched to the target eNodeB, UE sends a handoff acknowledgement to the target eNodeB.

S212, after receiving the handoff acknowledgement message, the target eNodeB sends a handoff completion message to MME to request MME to update relevant information. Wherein, the handoff completion message carries address information and the user plane tunnel information of the target eNodeB.

S214, MME transmits the address information and the user plane tunnel information of the target eNodeB to Serving GW. After the target eNodeB gets the user plane tunnel information and uplink/downlink data of Serving GW, transmission can be conducted between the eNodeB and Serving GW.

S216, Serving GW returns an updates bearer response to MME.

S218, MME returns a handoff completion response to the target eNodeB.

S220, the target eNodeB informs the source eNodeB to release resource.

The above handoff process is characterized in that the handoff between eNodeBs is not controlled by MME. The premises of the handoff above is that the two eNodeBs are connected through the X2 interface, and MME and Serving GW are unchangeable. This requires that one eNodeB is able to search out whether the other eNodeB has the X2 access and whether there is an access between a certain MME and Serving GW. It is necessary for the eNodeB to configure a certain MME, for eNodeB needs to find suitable MME at a user's primary registration. For Serving GW, however, it is MME that selects Serving GW in SAE, so there must be configuration of Serving GW in MME. If there was configuration of Serving GW in the eNodeB, the complexity of configuration of eNodeB would increase on one hand, and consistent configurations at the MME and eNodeB could hardly be assured on another hand.

BRIEF SUMMARY OF THE INVENTION

To address the above one or more problems, this invention provides a new intra-system handoff method.

The intra-system handoff method according to the embodiment of the present invention comprises the following steps: S302, when deciding a UE's handoff to a target base station, a source base station issues a handoff request to the target base station; S304, in response to the handoff request from the source base station, the target base station informs the source base station to conduct handoff for the UE; S306, after the completion of the handoff, the target base station issues an update request to an MME; and S308, in response to the update request from the target base station, the MME conducts Serving GW selection, and further fulfils the intra-system handoff. The handoff request carries address information of the MME.

Wherein, S304 comprises the following steps: S3042, in response to the handoff request from the source base station, the target base station determines whether there is an access to the MME according to the address information of the MME; S3044, in the case of there is an access to the MME, the target base station conducts relevant resource reservation and returns a handoff response to the source base station.

Wherein, S306 comprises the following steps: S3062, after receiving the handoff response is received, the source base station sends a handoff command to the UE, wherein the handoff command carries resource information of the target base station; S3064, after the handoff is completed according to the resource information of the target base station, the UE sends a handoff acknowledgement to the target base station; and S3066, after the handoff acknowledgement is received, the target base station sends the update request to the MME, wherein the update request carries at least user plane tunnel information and the address information of the target base station.

Wherein, S308 comprises the following steps: S3082-1, the MME determines whether to reselect a Serving GW or not; S3084-1, in the case of reselecting a Serving GW, the MME selects a new Serving GW according to user position information, and then issues a bearer request to the new Serving GW, wherein the bearer request carries at least user plane tunnel information and address information of the target base station and bearer information and address information of PDN GW; S3086-1, according to the user plane tunnel information and address information of the target base station and bearer information and address information of PDN GW, the MME configures bearer connection among the target base station, the new Serving GW and the PDN GW, to fulfill the intra-system handoff.

Alternatively, S308 comprises the following steps: S3082-2, the MME determines whether to reselect a Serving GW or not; S3084-2, in the case of not reselecting a Serving GW, the MME sends user plane tunnel information and address information of the target base station to the current Serving GW, to build bearer connection between the target base station and the current Serving GW.

During the process of determining whether to reselect a Serving GW or not, at least possibility of connection between the target base station and the current Serving GW should be take into consideration.

Wherein, both the source base station and the target base station are evolved base stations. The intra-system handoff method provided by the present invention can be applied to wireless communication system in evolved system architecture. The source base station and the target base station are connected through X2 interface.

By the present invention, the target eNodeB need not determine whether access to the Serving GW is available, and accordingly the target eNodeB can avoid from configuring Serving GW.

DETAILED DESCRIPTION OF THE PREFERRED EMBODIMENTS

The present invention provides a new intra-system handoff method. Wherein, when receiving a handoff request from a source eNodeB, the target eNodeB only needs to determine whether there exists access between the target eNodeB and MME, if not, the target eNodeB will return a handoff failure message to the source eNodeB; if so, the target eNodeB will continue the handoff process. After the handoff of UE to the target eNodeB, which informs MME of handoff completion, MME determines whether there exists access between the target eNodeB and Serving GW, if so, keep the same Serving GW; if not, MME will reselect a new Serving GW and configure bearer connection to the new Serving GW.

The reference figures below present detailed descriptions of the preferred embodiments of the present invention. If not conflict, the embodiments and the technical features of the embodiments can be combined.

Figure 3A:
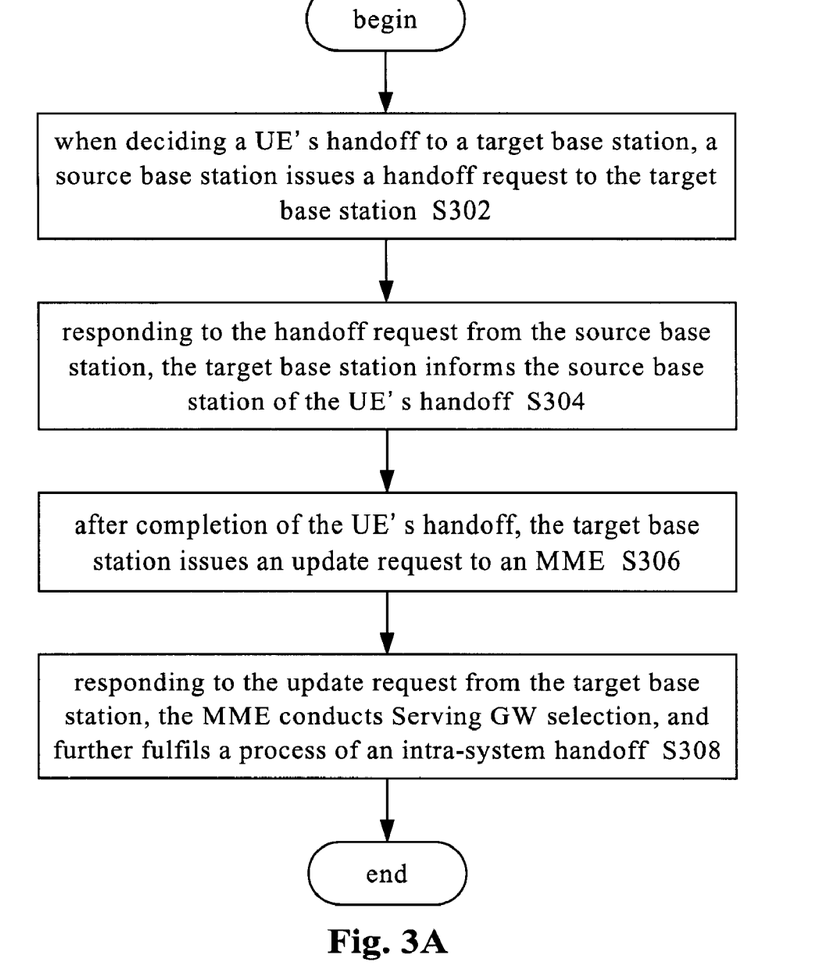
FIG. 3A-FIG. 3E are flow charts of the intra-system handoff method and its steps according to the embodiment of the present invention.

FIG. 3A-FIG. 3E illustrates the intra-system handoff method according to the embodiment of the present invention. As shown in FIG. 3A, the intra-system handoff method comprises the following steps: S302, when deciding a UE handoff to a target base station, a source base station issues a handoff request to the target base station; S304, responding to the handoff request from the source base station, the target base station informs the source base station of the UE handoff; S306, after completion of the UE handoff, the target base station issues an update request to an MME; and S308, responding to the request from the target base station, the MME conducts Serving GW selection, and further fulfils the process of the intra-system handoff. The handoff request therein carries the address information of the MME.

Figure 3B:
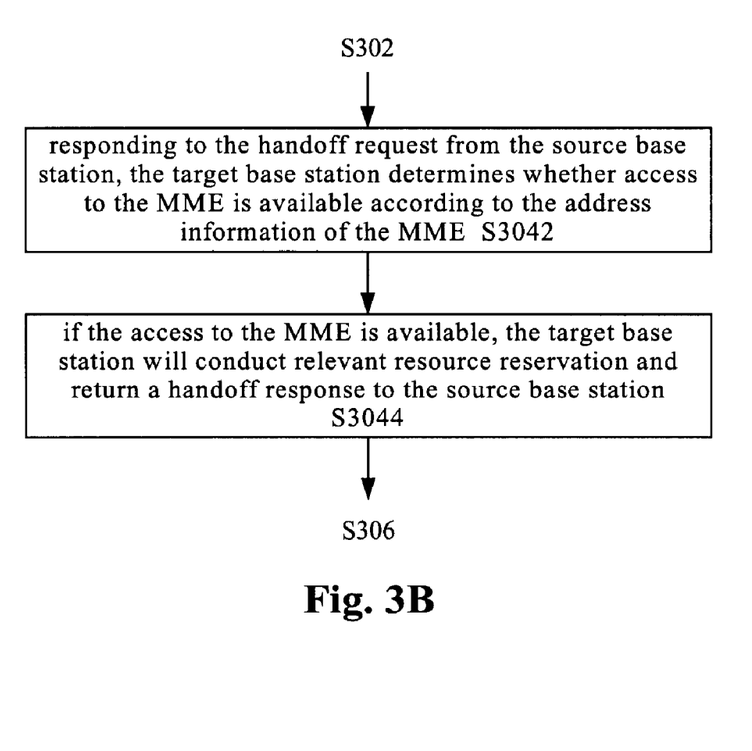

As shown in FIG. 3B, S304 comprises the following steps: S3042, responding to the handoff request from the source base station, the target base station determines whether there exists access between the target eNodeB and the MME according to the address information of the MME; S3044, if there exists access between the target eNodeB and the MME, the target base station will conduct relevant resource reservation and return a handoff response to the source base station.

Figure 3C:
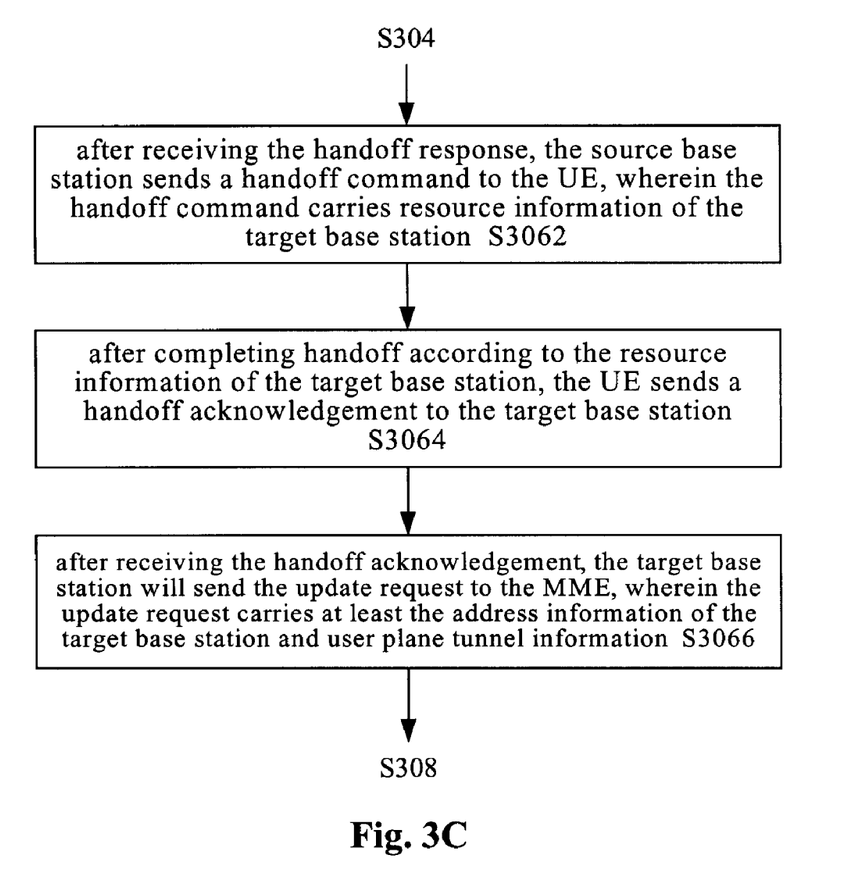

As shown in FIG. 3C, S306 comprises the following steps: S3062, after receiving the handoff response, the source base station sends a handoff command to the UE, wherein the handoff command carries resource information of the target base station; S3064, after completing the handoff according to the resource information of the target base station, the UE sends a handoff acknowledgement to the target base station; and S3066, after receiving the handoff acknowledgement, the target base station will send an update request to MME, wherein the update request carries at least the address information and user plane tunnel information of the target base station.

Figure 3D:
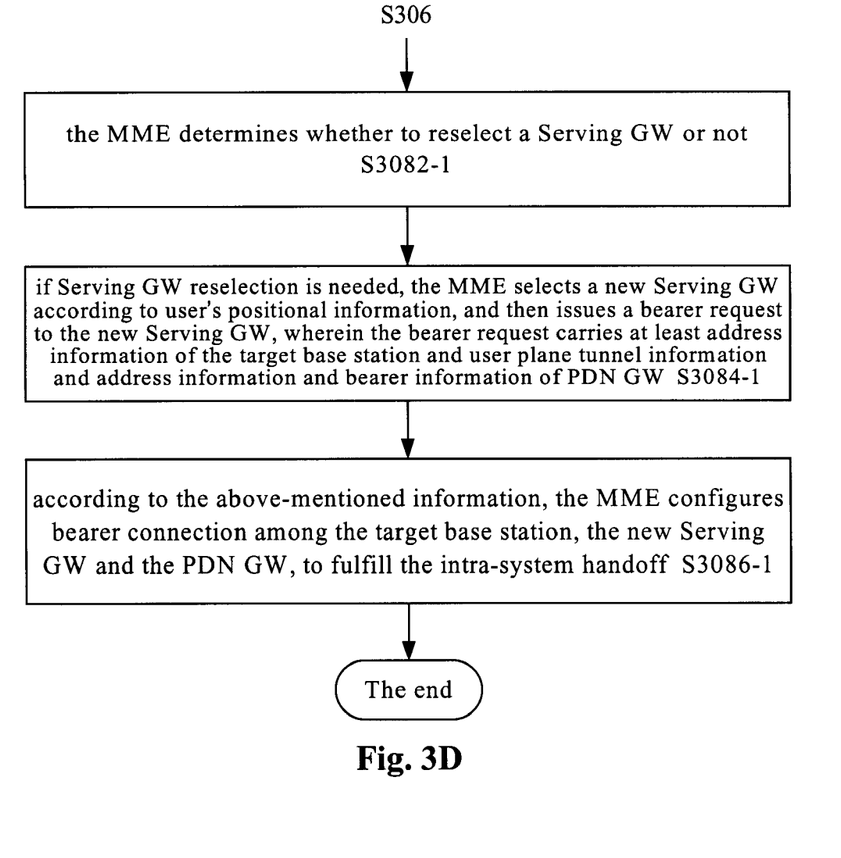

As shown in FIG. 3D, S308 comprises the following steps: S3082-1, MME determines whether to reselect Serving GW or not; S3084-1, if the reselection is needed, MME selects a new Serving GW according to user positional information and issues a bearer request to the new Serving GW. Wherein the bearer request carries at least address information and user plane tunnel information of the target base station, and address information and bearer information of PDN GW; S3086-1, according to the above address information and user plane tunnel information of the target base station and address information and bearer information of PDN GW, MME configures bearer connection among the target base station, the new Serving GW and PDN GW, to fulfill the intra-system handoff.

Figure 3E:
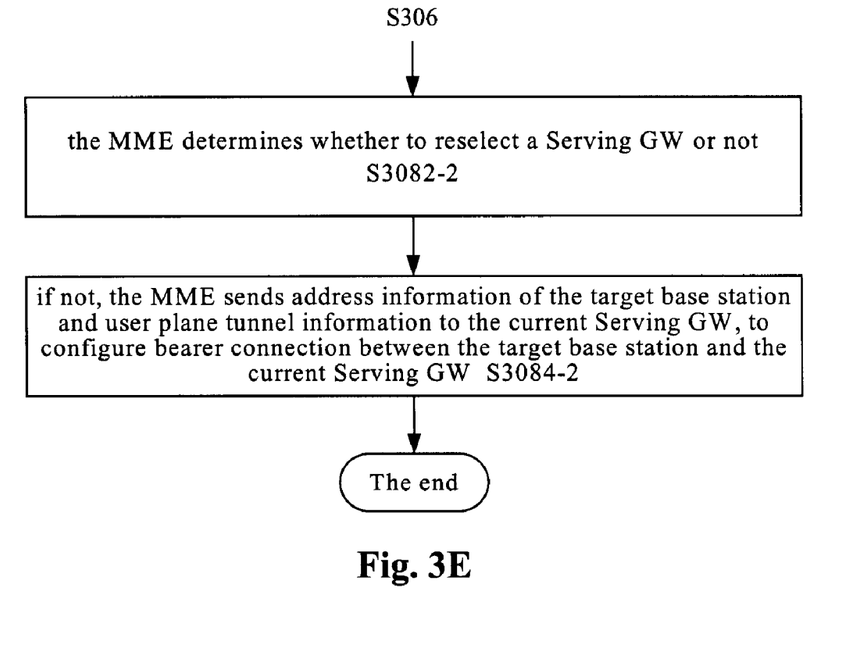

Alternatively, as shown in FIG. 3E, S308 comprises the following steps: S3082-2, MME determines whether to reselect a Serving GW; S3084-2, if the reselection isn't needed, MME sends address information and user plane tunnel information of target base station to the current Serving GW, to configure bearer connection between the target base station and the current Serving GW.

In the process of determining that whether to reselect a Serving GW or not, MME needs to consider at least the possibility of connection between the target base station and the current Serving GW.

Wherein, the source base station and the target base station are both evolved base station. The intra-system handoff method provided by the present invention can be applied to wireless communication system of evolved system architecture. The source base station and the target base station are connected through X2 interface.

Figure 4:
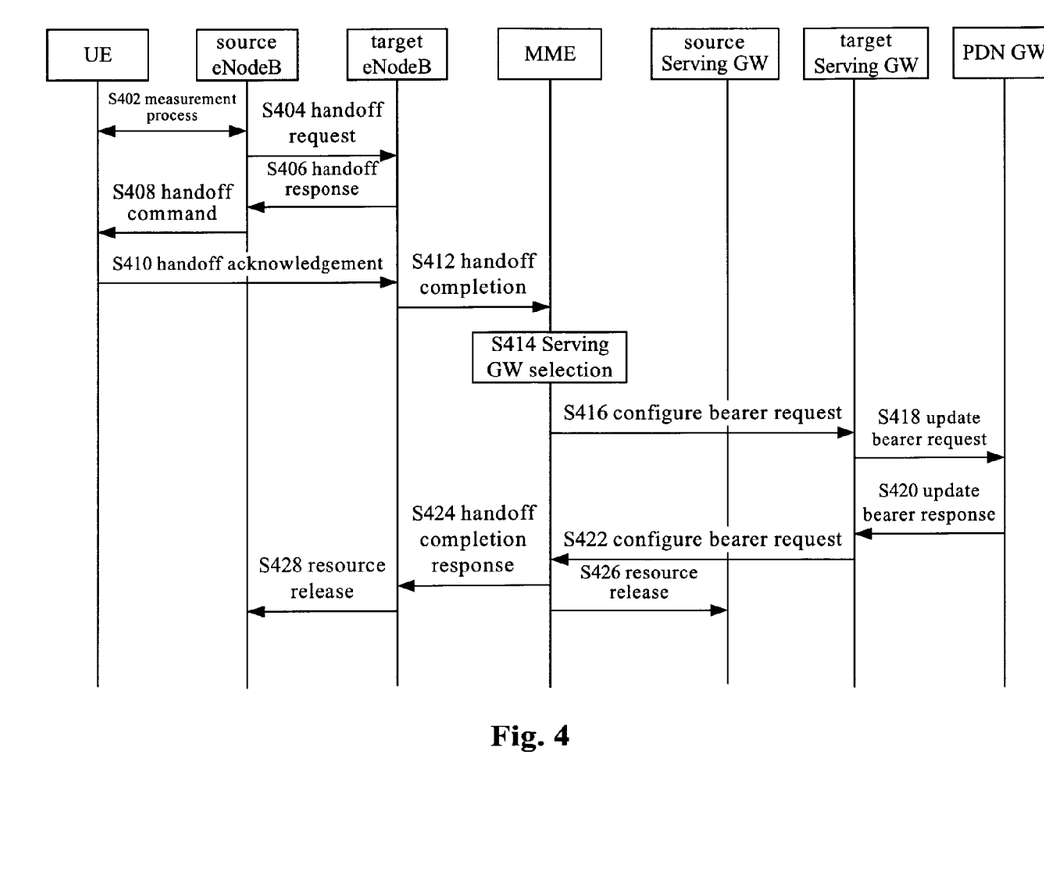
FIG. 4 is the detailed flow chart of the intra-system handoff method according to the embodiment of the present invention.

FIG. 4 shows the detailed flow of the intra-system handoff method according to the embodiment of the present invention. As shown in FIG. 4, the intra-system handoff method comprises the following steps:

S402, a source eNodeB orders UE to conduct a measurement, and after receiving UE's completion of the measurement report, the source eNodeB decides a handoff to a target cell.

S404, the source eNodeB searches for a corresponding target eNodeB according to the target cell. After finding the target eNodeB connected with the source eNodeB through X2 interface, the source eNodeB will issue a handoff request to the target eNodeB. The handoff request carries address information of the current MME.

S406, the target eNode determines whether access to the current MME exists. If the access exists, the target eNode will conduct relevant resource reservation and return a handoff response to the source eNodeB. Wherein, the handoff response carries relevant resource information.

S408, after receiving the handoff response, the source eNodeB orders the UE to begin the handoff process, carrying resource information of the target eNodeB.

S410, after handoff to the target eNodeB, UE sends handoff acknowledgement message to the target eNodeB.

S412, after receiving the handoff acknowledgement message, the target eNodeB sends handoff completion message to MME to request to update relevant information. Wherein, the handoff completion message carries the address information and user plane tunnel information of the eNodeB.

S414, MME selects Serving GW by determining whether the target eNodeB are connected with the present Serving GW or not. If the target eNodeB are connected with the present Serving GW, MME keep selecting the present Serving GW and afterward processing will be the same as shown in FIG. 2; if the target eNodeB are not connected with the present Serving GW, MME will select a new Serving GW connected with the eNodeB.

S416, MME issues a configure bearer request to the new Serving GW selected, with the address information and user plane tunnel information of the target eNodeB, as well as address information and bearer information of PDN GW.

S418, the new Serving GW issues an update bearer request to PDN GW, and tell its address information and tunnel information to the PDN GW.

S420, PDN GW returns an update bearer response to the new Serving GW.

S422, the new Serving GW returns a configure bearer response to MME, carrying tunnel information allotted.

S424, MME returns a handoff completion response to the target eNodeB, and tell the address information and tunnel information of the Serving GW to it.

By the above-mentioned procedures, tunnel of core network is completed from the target eNodeB and the new Serving GW to the PDN GW, and upstream/downstream data can be transmitted among the target eNodeB, Serving GW and PDN GW.

S426, MME releases resource of the former Serving GW.

S428, the target eNodeB informs the source eNodeB of releasing resource.

According to the embodiment of the present invention, computer program product for intra-system handoff is also provided. The computer program product comprises instructions for causing a processor to perform the steps shown in any one of FIG. 3A-3E and FIG. 4. For the person skilled in the art, it is easy to be achieved by referring to the embodiments described above and the figures, so details will be omitted.

To sum up, by the present invention, the target eNodeB need not determine whether access to the Serving GW is available, and accordingly it can avoid from configuring the Serving GW.

The present invention has been shown with reference to the above-described embodiments thereof, and it is not to be limited by the above embodiments. It is understood by those skilled in the art various alterations and changes may be made within the spirit and scope of the invention. All modifications, substitute equivalents or improvement made therein is intended to be embraced in the claims of this invention.

What is claimed is:

1. An intra-system handoff method comprising the following steps:
    S302, when deciding a handoff of UE to a target base station, a source base station issues a handoff request to the target base station;
    S304, in response to the handoff request from the source base station, the target base station informs the source base station to conduct handoff for the UE;
    S306, after the completion of the handoff, the target base station issues an update request to a Mobility Management Entity (MME);
    S308, in response to the update request from the target base station, the MME conducts Serving GW selection, and further fulfils the intra-system handoff; and
    S3066, after the handoff acknowledgement is received, the target base station sends the update request to the MME, wherein the update request carries at least user plane tunnel information and the address information of the target base station.

2. The intra-system handoff method according to claim 1, wherein, the handoff request carries address information of the MME.

3. The intra-system handoff method according to claim 2, wherein, the S304 comprising the following steps:
- S3042, in response to the handoff request from the source base station, the target base station determines whether there is an access to the MME according to the address information of the MME;
- S3044, in the case of there is an access to the MME, the target base station conducts relevant resource reservation and returns a handoff response to the source base station.

4. The intra-system handoff method according to claim 3, wherein, the S306 comprising the following steps:
- S3062, after the handoff response is received, the source base station sends a handoff command to the UE, wherein the handoff command carries resource information of the target base station; and
- S3064, after the handoff is completed according to the resource information of the target base station, the UE sends a handoff acknowledgement to the target base station.

5. The intra-system handoff method according to claim 4, wherein, the S308 comprising the following steps:
- S3082-1, the MME determines whether to reselect a Serving GW;
- S3084-1, in the case of reselecting a Serving GW, the MME selects a new Serving GW according to user position information, and then issues a bearer request to the new Serving GW, wherein the bearer request carries at least user plane tunnel information and address information of the target base station and bearer information and address information of PDN GW;
- S3086-1, according to the user plane tunnel information and address information of the target base station and bearer information and address information of PDN GW, the MME configures bearer connection among the target base station, the new Serving GW and the PDN GW, to fulfill the intra-system handoff.

6. The intra-system handoff method according to claim 4, wherein the S308 comprising the following steps:
- S3082-2, the MME determines whether to reselect a Serving GW or not;
- S3084-2, in the case of not reselecting a Serving GW, the MME sends user plane tunnel information and address information of the target base station to the current Serving GW, to build bearer connection between the target base station and the current Serving GW.

7. The intra-system handoff method according to claim 5, wherein, during the process of determining whether to reselect a Serving GW or not, at least possibility of connection between the target base station and the current Serving GW should be take into consideration.

8. The intra-system handoff method according to claim 1, wherein, both the source base station and the target base station are evolved base stations.

9. The intra-system handoff method according to claim 8, wherein, the method is applicable to wireless communication system in evolved system architecture.

10. The intra-system handoff method according to claim 9, wherein, there is a X2 interface between the source base station and the target base station.

11. The intra-system handoff method according to claim 6, wherein, during the process of determining whether to reselect a Serving GW or not, at least possibility of connection between the target base station and the current Serving GW should be take into consideration.

12. The intra-system handoff method according to claim 2, wherein, both the source base station and the target base station are evolved base stations.

13. The intra-system handoff method according to claim 12, wherein, the method is applicable to wireless communication system in evolved system architecture.

14. The intra-system handoff method according to claim 3, wherein, both the source base station and the target base station are evolved base stations.

15. The intra-system handoff method according to claim 14, wherein, the method is applicable to wireless communication system in evolved system architecture.

16. The intra-system handoff method according to claim 4, wherein, both the source base station and the target base station are evolved base stations.

17. The intra-system handoff method according to claim 16, wherein, the method is applicable to wireless communication system in evolved system architecture.

18. The intra-system handoff method according to claim 5, wherein, both the source base station and the target base station are evolved base stations.

19. The intra-system handoff method according to claim 18, wherein, the method is applicable to wireless communication system in evolved system architecture.

20. The intra-system handoff method according to claim 6, wherein, both the source base station and the target base station are evolved base stations.

* * * * *

UNITED STATES PATENT AND TRADEMARK OFFICE
CERTIFICATE OF CORRECTION

PATENT NO. : 8,280,381 B2
APPLICATION NO. : 12/476591
DATED : October 2, 2012
INVENTOR(S) : Jinguo Zhu et al.

Page 1 of 1

It is certified that error appears in the above-identified patent and that said Letters Patent is hereby corrected as shown below:

Title Page, Item (63) Related U.S. Application Data, --PCT/CN2007/003976-- should be "PCT/CN2007/003975".

In the Specifications
Column 1, lines 3 and 4 --PCT/CN2007/003976-- should be "PCT/CN2007/003975".

Signed and Sealed this
Thirtieth Day of July, 2013

Teresa Stanek Rea
*Acting Director of the United States Patent and Trademark Office*